UNITED STATES PATENT OFFICE.

GERVAIS BAILLIO, OF NIAGARA FALLS, NEW YORK, ASSIGNOR TO ISCO CHEMICAL COMPANY, OF NIAGARA FALLS, NEW YORK, A CORPORATION OF NEW YORK.

PROCESS OF MAKING CARBON TETRACHLORID FROM CARBON BISULFID AND CHLORIN.

1,260,622. Specification of Letters Patent. Patented Mar. 26, 1918.

No Drawing. Application filed April 30, 1917. Serial No. 165,544.

*To all whom it may concern:*

Be it known that I, GERVAIS BAILLIO, a citizen of the United States, residing at Niagara Falls, in the county of Niagara and State of New York, have invented certain new and useful Improvements in Processes of Making Carbon Tetrachlorid from Carbon Bisulfid and Chlorin; and I do hereby declare the following to be a full, clear, and exact description of the invention, such as will enable others skilled in the art to which it appertains to make and use the same.

This invention relates to a process of making carbon tetra-chlorid from carbon bi-sulfid and has for its object to improve the methods heretofore proposed.

With this object in view the invention consists in the novel combinations of steps constituting the process, all as will be more fully hereinafter disclosed and particularly pointed out in the claims.

In my co-pending application #163684, filed April 21, 1917, and entitled Process of making carbon tetra-chlorid and by-products, I have disclosed a process involving the passing of free chlorin into carbon bi-sulfid containing some free sulfur in order to form sulfur mono-chlorid and to permit the said sulfur mono-chlorid to react, in the presence of a catalyst, with the carbon bi-sulfid to form a final mixture of carbon tetra-chlorid and sulfur mono-chlorid.

I have discovered that it is not necessary to react on all of the carbon bi-sulfid with the sulfur mono-chlorid, but that a portion of the carbon tetra-chlorid may be formed by reacting on an additional quantity of carbon bi-sulfid with sulfur di-chlorid, all as will now be disclosed.

That is to say, I have found that if an excess of chlorin is passed in the presence of a catalyst into the mixture of carbon tetra-chlorid and sulfur mono-chlorid, some sulfur di-chlorid $SCl_2$ will be formed, and that this said sulfur di-chlorid may be utilized to react upon an additional quantity of carbon bi-sulfid to form additional quantities of carbon tetra-chlorid and sulfur mono-chlorid, all as will be clear from the following equations:—

(a) $S_2Cl_2 + 2Cl = 2SCl_2$
(b) $6SCl_2 + CS_2 = CCl_4 + 4S_2Cl_2$

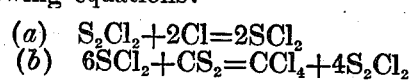

In other words, in carrying out this process, the chlorin gas may be first passed into a quantity of carbon bi-sulfid containing some free sulfur to form a mixture of carbon tetra-chlorid and sulfur mono-chlorid, or the sulfur mono-chlorid may be otherwise provided. Into this said mixture additional chlorin is passed until a substantial quantity of sulfur di-chlorid is formed at the expense of the sulfur mono-chlorid present.

To this last named mixture containing a substantial quantity of sulfur di-chlorid, carbon bi-sulfid $CS_2$ is next added in a quantity sufficient to convert substantially all the sulfur di-chlorid present into sulfur mono-chlorid and an additional quantity of carbon tetra-chlorid.

A portion of this final mixture containing carbon tetra-chlorid and sulfur mono-chlorid is now drawn off, after which the remaining portion is again treated with chlorin gas to convert a substantial part of its contained sulfur mono-chlorid into sulfur di-chlorid, whereupon more carbon bi-sulfid is added and the process repeated.

By following the above disclosed procedure, I am enabled to very considerably increase the output of the carbon tetra-chlorid over that obtainable by following the process disclosed in my said application above mentioned.

The desired carbon tetra-chlorid is separated from the sulfur mono-chlorid by any suitable process, as for example that disclosed in my copending application Serial No. 165543, filed April 30, 1917, and entitled Process of separating carbon tetra-chlorid from other compounds.

It is obvious that those skilled in the art may vary the details of the procedure without departing from the spirit of the invention, and therefore, I do not wish to be limited to the above disclosure except as may be required by the claims.

What I claim is:—

1. The process of making carbon tetra-chlorid from carbon bi-sulfid which consists in providing a mixture containing carbon tetra-chlorid and sulfur mono-chlorid; passing free chlorin into said mixture until a substantial portion of said sulfur mono-chlorid is converted into sulfur di-chlorid; adding sufficient carbon bi-sulfid to the mixture thus produced to convert a substantial quantity of the sulfur di-chlorid present into sulfur mono-chlorid and carbon tetra-chlorid; and finally separating out the carbon tetra-chlorid, substantially as described.

2. The process of making a mixture of carbon tetra-chlorid and sulfur mono-chlorid, which consists in providing a quantity of sulfur mono-chlorid; treating the same with chlorin to form sulfur di-chlorid; adding to the latter carbon bi-sulfid and causing the same to decompose said sulfur di-chlorid into a mixture of carbon tetra-chlorid and sulfur mono-chlorid, substantially as described.

3. The process of making carbon tetra-chlorid from carbon bi-sulfid which consists in passing in the presence of a catalyst an excess of free chlorin into carbon bi-sulfid containing free sulfur to form sulfur di-chlorid and carbon tetra-chlorid; adding an additional quantity of carbon bi-sulfid to the mixture thus produced to form sulfur mono-chlorid and an additional quantity of carbon tetra-chlorid; and suitably separating out the carbon tetra-chlorid, substantially as described.

4. The process of making a mixture containing carbon tetra-chlorid and sulfur mono-chlorid which consists in treating carbon bi-sulfid containing free sulfur with an excess of chlorin in the presence of a catalyst to form a mixture containing sulfur di-chlorid; and adding an additional quantity of carbon bi-sulfid to said mixture to form sulfur mono-chlorid and an additional quantity of carbon tetra-chlorid, substantially as described.

5. The continuous process of making a mixture of carbon tetra-chlorid and sulfur mono-chlorid which consists in treating sulfur mono-chlorid with chlorin to form sulfur di-chlorid; adding carbon bi-sulfid to said sulfur di-chlorid to form a mixture of carbon tetra-chlorid and sulfur mono-chlorid; drawing off a portion of said mixture; and treating the remaining portion of said mixture with chlorin to reproduce the sulfur di-chlorid, substantially as described.

In testimony whereof I affix my signature in presence of two witnesses.

GERVAIS BAILLIO.

Witnesses:
MARIE KEELTY,
EBEN C. SPEIDEN.